(12) United States Patent
Rabinovich et al.

(10) Patent No.: US 8,228,957 B1
(45) Date of Patent: *Jul. 24, 2012

(54) DIFFERENTIAL DELAY MITIGATION IN DIVERSE BACKHAUL ENVIRONMENTS

(75) Inventors: Boris Rabinovich, San Francisco, CA (US); John Huang, Palo Alto, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 739 days.

This patent is subject to a terminal disclaimer.

(21) Appl. No.: 11/442,460

(22) Filed: May 26, 2006

(51) Int. Cl.
*H04J 3/06* (2006.01)
(52) U.S. Cl. .......... 370/519; 370/252; 370/350
(58) Field of Classification Search .......... 370/230, 370/231, 232, 252, 253, 310.2, 312, 324, 370/328, 338, 350, 432, 503, 516, 517, 519
See application file for complete search history.

(56) References Cited

U.S. PATENT DOCUMENTS

| 5,722,074 | A | * | 2/1998 | Muszynski | 455/442 |
| 5,828,659 | A | * | 10/1998 | Teder et al. | 370/328 |
| 5,838,669 | A | * | 11/1998 | Gerakoulis | 370/320 |
| 5,912,701 | A | * | 6/1999 | Morton, Jr. | 348/192 |
| 6,778,512 | B2 | * | 8/2004 | Gipson et al. | 370/330 |
| 7,120,132 | B2 | * | 10/2006 | Choi et al. | 370/324 |
| 2001/0036168 | A1 | * | 11/2001 | Terry | 370/337 |
| 2005/0157658 | A1 | * | 7/2005 | Ishii et al. | 370/252 |
| 2006/0092850 | A1 | * | 5/2006 | Neidhardt et al. | 370/252 |
| 2006/0104232 | A1 | * | 5/2006 | Gidwani | 370/328 |

* cited by examiner

*Primary Examiner* — Ricky Ngo
*Assistant Examiner* — Eric Kao

(57) ABSTRACT

A communication system comprises a mobile switching center configured to determine a first delay metric for first traffic on a first path from the mobile switching center to a first node, and determine a first delay differential based on the first delay metric and a second delay metric for second traffic on a second path from the mobile switching center to a second node. The communication system also comprises the second node having a delay buffer configured to delay the second traffic based on the first delay differential.

16 Claims, 6 Drawing Sheets

DIFFERENTIAL DELAY MITIGATION IN DIVERSE BACKHAUL ENVIRONMENTS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to mitigating differential delay in diverse backhaul environments.

2. Description of the Prior Art

Cellular communication networks often times include wireless devices that transmit communications to base station transceivers. The base station transceivers transfer the communications over a cellular backhaul to a mobile switching center (MSC). The MSC then routes the communications to their appropriate destination. T-1 lines are typically used for the backhaul. Packet based transports are also frequently used for the backhaul. For example, simulated T-1 over Ethernet is commonly used for the backhaul. In yet another example, many carriers are beginning to use WiMAX technologies for cellular backhaul. Unfortunately, delay problems occur when different types of technologies are utilized for the backhaul communication network.

FIG. 1 illustrates telecommunication network 100 in an example of the prior art. Telecommunication network 100 includes MSC 110, base transceiver station (BTS) 120, BTS 125, BTS 130, wireless device 140, and public switched telephone network (PSTN) 150. MSC 110 is coupled BTSs 120 and 125 by T-1 lines 111 and 113 respectively. BTS 130 is coupled to MSC by Ethernet backhaul link 112. Wireless device 140 is in communication with base stations 120, 125, and 130 using a wireless protocol, such as GSM or CDMA. MSC 110 is coupled to PSTN 150 by a trunk connection as is well known in the art. Other elements are possible, such as a base station controller, but are not shown for the sake of clarity.

During a call, wireless device 140 transmits communications simultaneously to BTSs 120, 125, and 130. The communications transmitted from wireless device 140 are transported over both T-1 lines 111 and 113, and Ethernet backhaul link 112. The communications arrive at MSC 110. MSC 110 selects the communications from either of the T-1 lines or the Ethernet backhaul link. MSC 110 then routes the communications to their appropriate destination. Communications that are received into MSC 110 from the destination are routed to T-1 lines 111 and 113 and Ethernet backhaul link 112. All three base stations 120, 125, and 130 then transmit the communications to wireless device 140. Wireless device 140 selects one of the three transmitted signals based upon several factors, such as their respective signal strengths.

As is well known in the art, backhaul connections typically involve some amount of delay. In this example, the delay associated with T-1 lines 111 and 113 are relatively similar. Thus, when MSC 110 switches between line 111 and line 113, the two communication streams from each line are adequately synchronized. Unfortunately, the delay associated with Ethernet backhaul link 112 is often times unpredictable. In addition, the delay associated with Ethernet backhaul link 112 is often times much greater than that of T-1 lines 111 and 113. As a result, packets arriving after the time interval where they can be used are discarded, and the end users experience call degradation when MSC 110 switches between one of the T-1 lines and Ethernet backhaul link 112. For instance, the users hear a gap in their conversations. Even more problematically, the call could be dropped entirely. The increased use of WiMAX technologies will further exacerbate the above problems.

SUMMARY OF THE INVENTION

An embodiment of the invention helps solve the above problems and other problems by providing systems and methods for dynamically delaying first traffic on a first path over one type of backhaul in order to reduce the delay differential between the first traffic and second traffic that is carried over a second path over a different type of backhaul. In an embodiment, a communication system comprises a mobile switching center configured to determine a first delay metric for first traffic on a first path from the mobile switching center to a first node, and determine a first delay differential based on the first delay metric and a second delay metric for second traffic on a second path from the mobile switching center to a second node. The communication system also comprises the second node having a delay buffer configured to delay the second traffic based on the first delay differential.

In an embodiment of the invention, the mobile switching center is further configured to determine a second delay differential based on the first delay metric and a third delay metric for third traffic on a third path from the mobile switching center to a third node having another delay buffer, and wherein the other delay buffer is further configured to delay the third traffic based on the second delay differential.

In an embodiment of the invention, the mobile switching center is further configured to transmit a timing request to the first node and receive an acknowledgment message from the first node in response to the timing request and determine the first delay metric based on a time differential between the timing request and the acknowledgment message.

In an embodiment of the invention, the delay buffer is further configured to delay the second traffic based on the delay differential to synchronize the second traffic with the first traffic to within a synchronization parameter.

In an embodiment of the invention, the first node comprises a base transceiver system.

In an embodiment of the invention, the second node comprises a base transceiver system.

In an embodiment of the invention, the first path comprises an Ethernet path.

In an embodiment of the invention, the first path comprises a WiMAX path.

In an embodiment of the invention, the second path comprises a T-1 line.

In an embodiment of the invention, the first traffic comprises voice communications.

In an embodiment of the invention, a method of operating a communication system comprises determining a first delay metric for first traffic on a first path from a mobile switching center to a first node, determining a first delay differential based on the first delay metric and a second delay metric for second traffic on a second path from the mobile switching center to a second node, and delaying the second traffic at the second node based on the first delay differential.

In an embodiment of the invention, the method includes determining a second delay differential based on the first delay metric and a third delay metric for third traffic on a third path from the mobile switching center to a third node, and delaying the third traffic at the third node based on the second delay differential.

In an embodiment of the invention, the method includes transmitting a timing request to the first node and receiving an acknowledgment message from the first node in response to the timing request and determining the first delay metric based on a time differential between the timing request and the acknowledgment message.

In an embodiment of the invention, the method includes delaying the second traffic based on the delay differential to synchronize the second traffic with the first traffic to within a synchronization parameter.

BRIEF DESCRIPTION OF THE DRAWINGS

The same reference number represents the same element on all drawings.

DETAILED DESCRIPTION OF THE PREFERRED EMBODIMENT

FIGS. 2-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
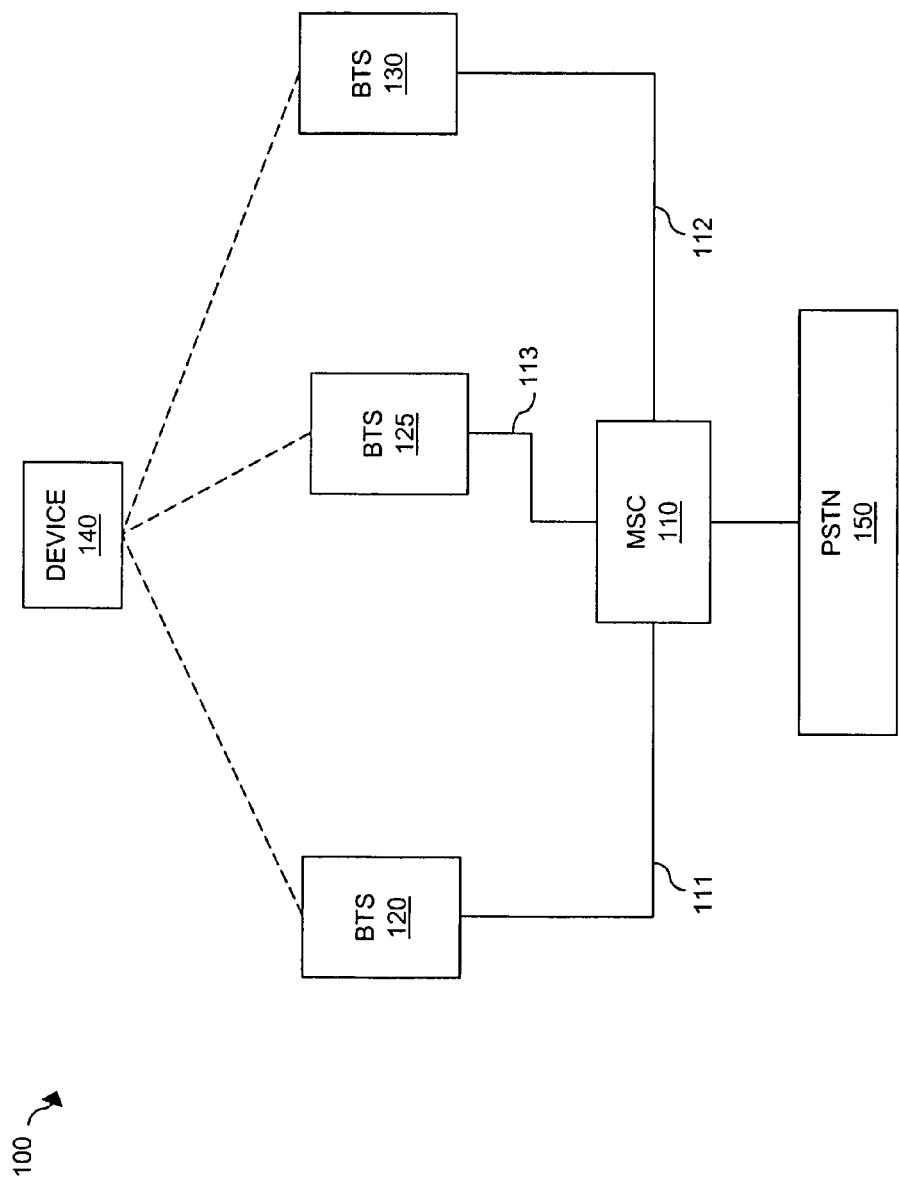
FIG. 1 illustrates a telecommunication system in an example of the prior art.
Figure 2:
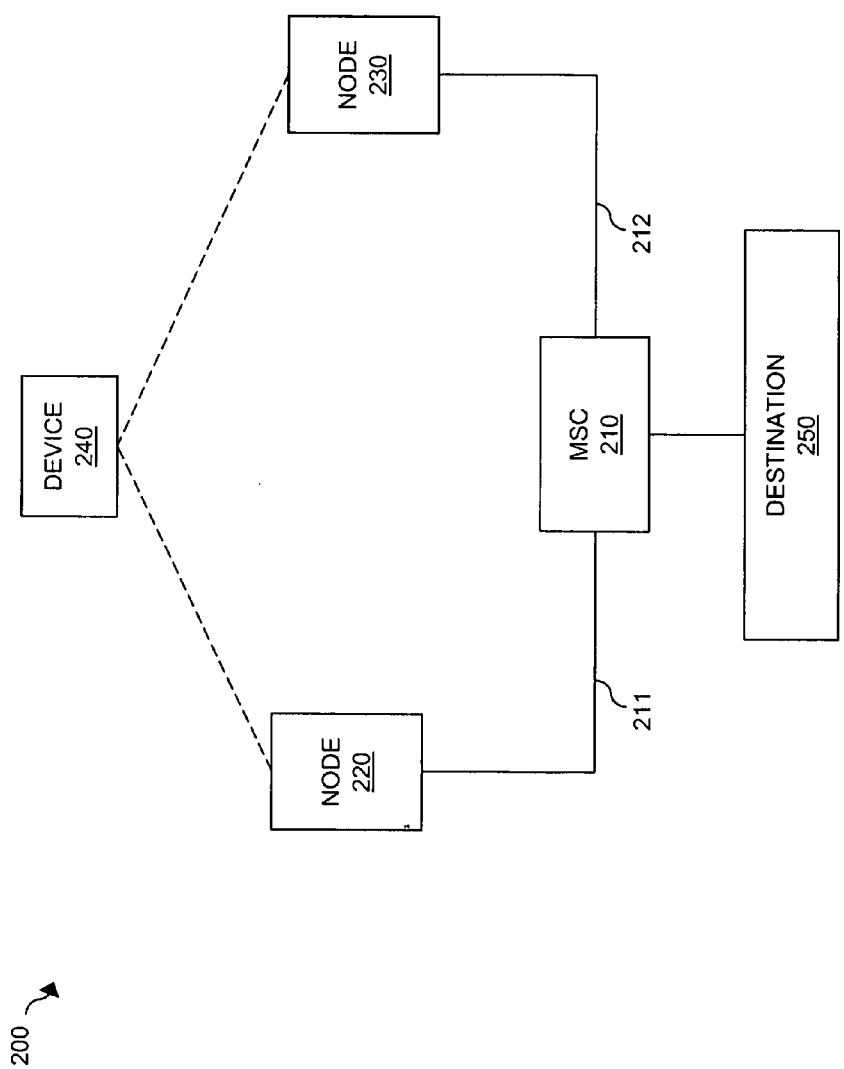
FIG. 2 illustrates a communication system in an embodiment of the invention.
Figure 3:
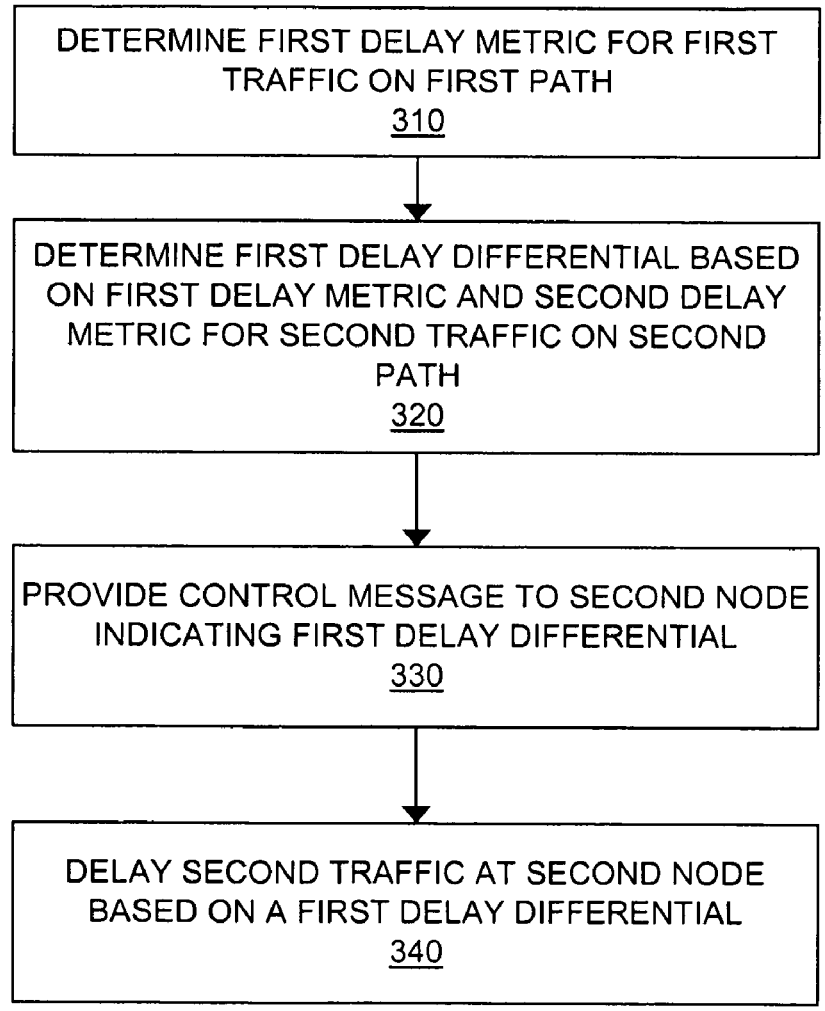
FIG. 3 illustrates the operation of a communication system in an embodiment of the invention.

FIGS. 2 and 3

FIG. 2 illustrates communication network 200 in an embodiment of the invention. Communication network 200 includes mobile switching center (MSC) 210, node 220, node 230, and device 240. Node 220 is in communication with MSC 210 by path 211. Node 230 is in communication with MSC 210 by path 212. MSC 210 is also in communication with destination 250. Device 240 is in communication with both node 220 and node 230.

In this embodiment, device 240 could be in communication with node 220 and 230 simultaneously, transmitting and receiving communications between itself and nodes 220 and 230. In this example, downstream traffic will be considered traffic sent from destination 250 to MSC 210. MSC 210 receives and processes the downstream traffic, and transfers the downstream traffic along paths 211 and 212 to nodes 220 and 230. Nodes 220 and 230 then transmit the downstream traffic to device 240. Upstream traffic will be considered communications transferred from device 240 to node 220 and 230. The upstream traffic is then transferred along paths 211 and 212 to MSC 210.

FIG. 3 illustrates the operation of MSC 210 in an embodiment of the invention. It is assumed in this embodiment that, at any given time, MSC 210 only uses traffic from one of paths 211 and 212. For example, if node 220 provides a stronger signal to device 240, MSC 210 will use traffic from path 211 over traffic from path 212. However, the respective signal strengths of nodes 220 and 230 could change, thereby leading MSC 210 to alter which path it utilizes. In this case, upstream traffic along path 212 could be significantly delayed as compared to upstream traffic along path 211. Similarly, downstream traffic along path 212 could also be significantly delayed as compared to downstream traffic along path 211.

To synchronize the upstream traffic across paths 211 and 212, MSC 210 first determines a first delay metric for the upstream traffic on path 212 (Step 310). The first delay metric could be, for example, the amount of time it takes for a packet message to reach node 230 from MSC 210 along path 212. Next, MSC 210 determines a first delay differential based on the first delay metric and a second delay metric for the upstream traffic on path 211 (Step 320). The second delay metric could be, for example, the amount of time it takes for a packet message to reach node 220 from MSC 210 along path 211. MSC 210 then provides a control message to node 220 indicating the first delay differential (Step 330). Node 220 responsively delays the upstream traffic to be transmitted to MSC 210 over path 211 based on the first delay differential (Step 340). For example, if the delay differential is 2 milliseconds, the upstream traffic from path 211 is delayed by 2 milliseconds.

In this manner, slower upstream traffic from path 212 is now synchronized with upstream traffic from path 211. Advantageously, when MSC 210 switches between paths 211 and 212, the upstream traffic from each path is synchronized. Destination 250 will no longer experience communication degradation, such as gaps or dropped sessions. A similar process can be applied to downstream traffic whereby MSC 210 instructs node 220 to delay downstream traffic received over path 211 relative to the downstream traffic sent along path 212. The two downstream traffic flows along paths 211 and 212 will therefore each be transmitted to device 240 from nodes 220 and 230 nearly simultaneously.

Second Embodiment Configuration and Operation

FIGS. 4-6

Figure 4:
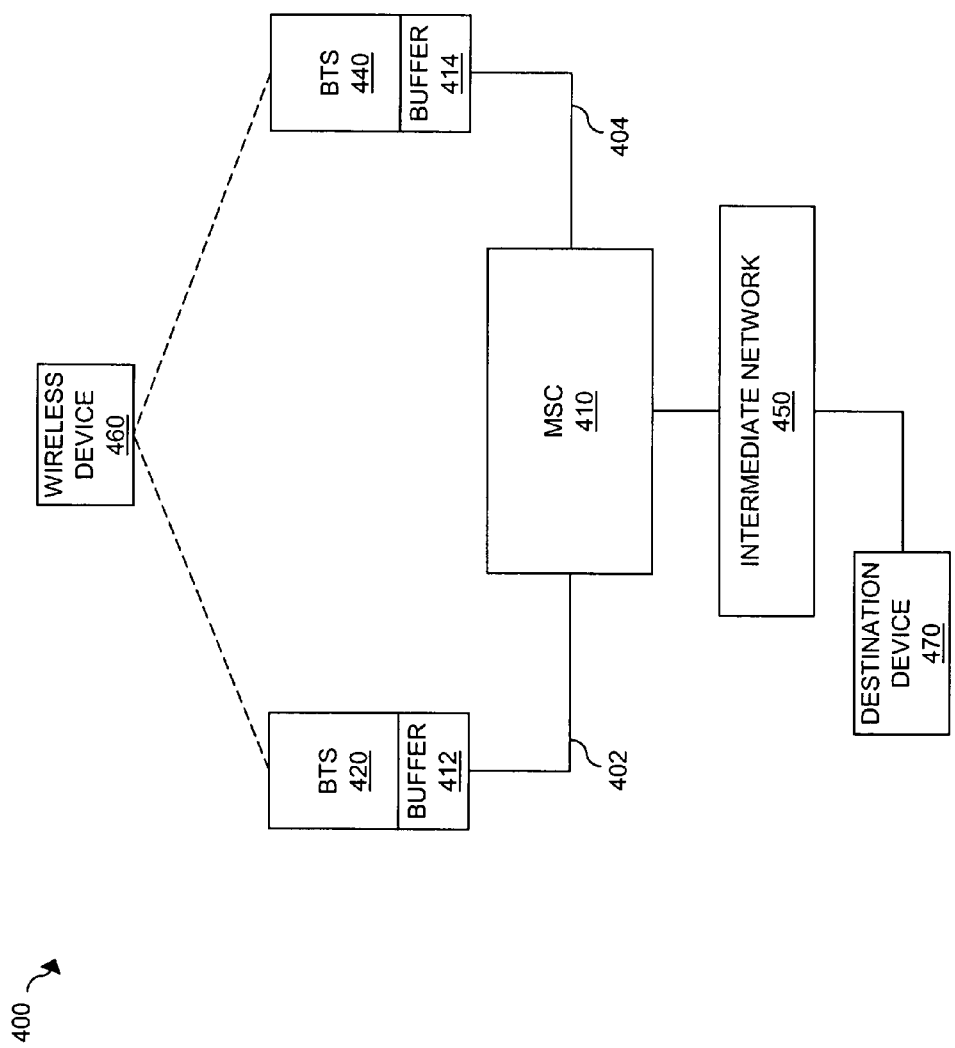
FIG. 4 illustrates a communication system in an embodiment of the invention.

FIG. 4 illustrates communication network 400 in an embodiment of the invention. Communication network 400 includes mobile switching center (MSC) 410, base station transceiver (BTS) 420, BTS 440, wireless device 460, intermediate network 450, and destination device 470. BTS 420 and 440 include differential delay buffers 412 and 414 respectively. Delay buffers 412 and 414 could be implemented in a network card, general purpose memory, special purpose memory, or the like. BTS 420 is in communication with MSC 410 over backhaul path 402. BTS 440 is in communication with MSC 410 over backhaul path 404. Paths 402 and 404 could be wireline or wireless paths. Wireless device 460 is in communication with BTS 420 and BTS 440 using a wireless communication protocol, such as CDMA, TDMA, and GSM, or well known variations thereof, as well as other protocols. MSC 410 is in communication with intermediate network 450 in a manner well known in the art. Intermediate network 450 could be, for example, the public switched telephone network (PSTN), as well as other types of networks that would reside between wireless device 460 and destination device 470.

In this embodiment, wireless device 460 has established a service session with destination device 470. The service session could be, for example, a voice call, a data session, or a real-time video session, as well as other types of sessions. Wireless device 460 transmits session traffic simultaneously to BTS 420 and BTS 440. BTS 420 transfers the traffic along path 402 to MSC 410. BTS 440 transfers the traffic along path 404 to MSC 410. Path 402 could be, for example, a time division multiplexed (TDM) path, such as a T-1 line. Path 404 could be, for example, a packet based path, such as a Pseudo Wire connection, an emulated T-1 over Ethernet connection, a Fast Ethernet connection, or a WiMAX connection, as well as other types of wireless or wireline paths.

Figure 5:
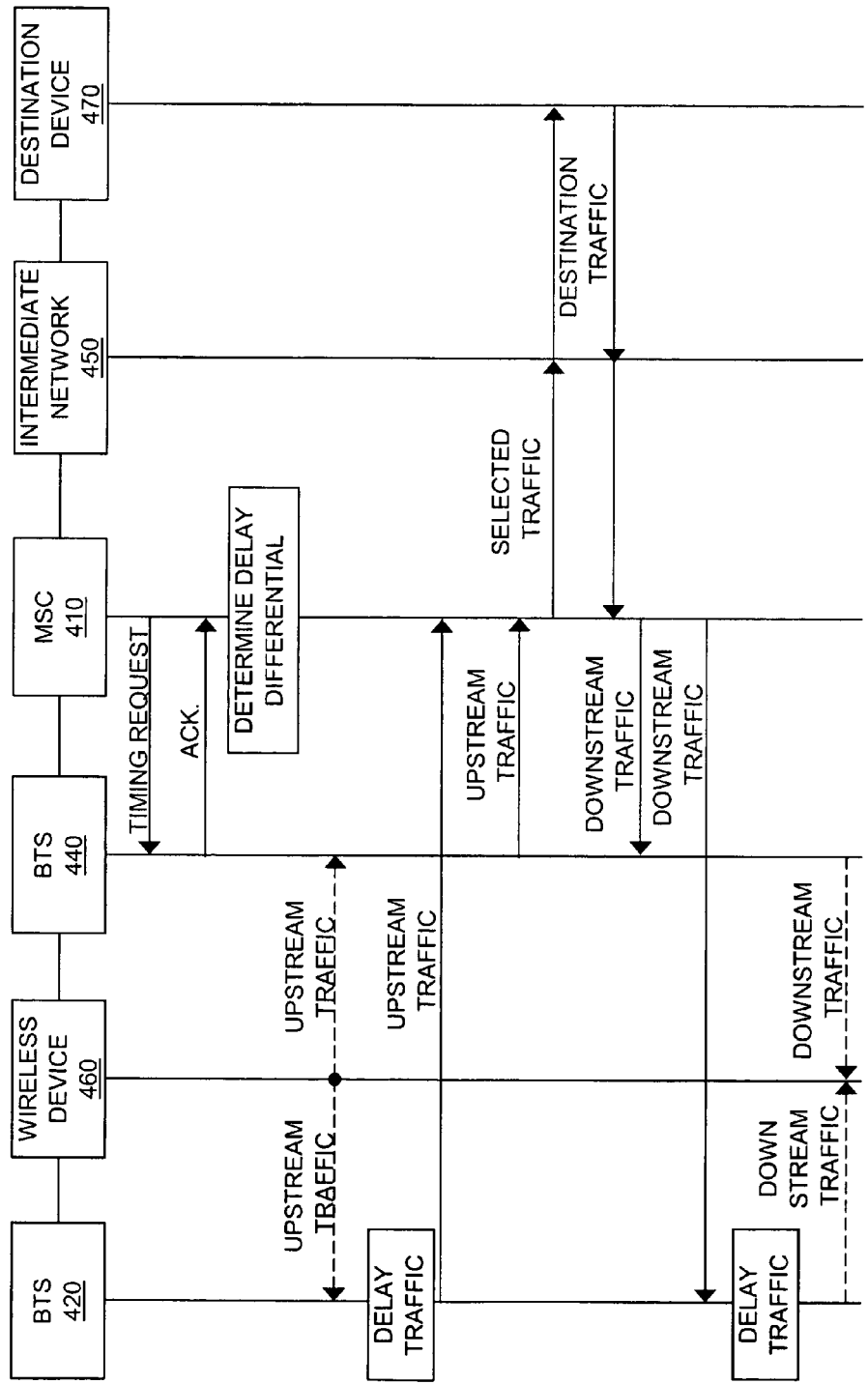
FIG. 5 illustrates the operation of a communication system in an embodiment of the invention.

As discussed with respect to the prior art, path 402 incurs a different amount of delay than path 404. For instance, traffic sent over path 402 from BTS 420 will arrive at MSC 410 earlier than traffic sent over path 404 from PTS 440. Similarly, traffic sent from MSC 410 to BTS 420 will arrive earlier than traffic sent from MSC 410 to BTS 440. To overcome this limitation, MSC 410 determines a delay differential based on the delay of path 402 and the delay of path 404. FIG. 5 is a flow chart illustrating a messaging sequence for determining the delay differential.

To begin, MSC 410 transfers a timing request to BTS 440. The timing request could be a packet message requesting a time stamp from BTS 440. BTS 440 would receive the packet message and return an acknowledgment message in response to the timing request. The acknowledgment message could include the time stamp. MSC 410 would then determine a delay metric for path 404 based on the roundtrip time elapsed between sending the timing request and receiving the acknowledgment message. MSC 410 could also determine the delay metric based on the time elapsed between the time stamp included in the acknowledgment message and the time the acknowledgment message was received into MSC 410.

MSC 410 could perform a similar operation with respect to BTS 420 and path 402 to determine a delay metric for path 402. Alternatively, the delay metric for 402 could be predetermined or already known. The delay differential is therefore determined based on the delay metric for path 404 and the delay metric for path 402. The delay differential could be stated in terms of a unit of time, a number of packets, or a number of frames, as well as in other ways.

In this embodiment, it is assumed that the delay metric for path 404 is greater than the delay metric for path 402. In other words, traffic transmitted along path 404 travels at a slower rate than traffic transmitted along path 402. As a consequence, the traffic from BTS 420 is out of synch with the traffic from BTS 440. This causes traffic degradation when MSC 410 switches between path 402 and 404. To correct this problem, MSC 410 provides a control message to BTS 420 to delay the traffic to be transmitted on path 402 based on the delay differential. For instance, if the delay differential is 2 milliseconds, BTS 420 will delay the traffic from path 402 by 2 milliseconds. In this manner, the traffic from path 402 is synchronized with the traffic from path 404. Advantageously, this allows MSC 410 to switch between paths 402 and 404 without causing any traffic degradation.

With respect to traffic flow originating from destination device 470, destination device 470 transfers traffic across intermediate network 450 to MSC 410. In the prior art, MSC 410 would typically transfers the traffic simultaneously to BTS 420 and BTS 440. However, traffic sent along path 404 will be out of synch with traffic sent along path 402. As a consequence, traffic degradation will occur if wireless device 460 switches between traffic streams. For instance, a user will experience a gap in the service session. As discussed above, this problem is solved by delaying the traffic received on path 402 relative to the traffic on path 404. Upon receiving notification of the delay differential, BTS 420 delays the traffic received on path 402 based on the delay differential. In this manner, traffic arriving at wireless device 460 from BTS 420 and BTS 440 is synchronized. Advantageously, this allows wireless device 460 to switch between BTS 420 and BTS 440 as the primary base station transceiver.

It should be understood that the delay differential need not be zero for paths 402 and 404 to be considered synchronized. Rather, an acceptable parameter could be agreed upon, whereby delay differentials exceeding the parameter would cause MSC 410 to determine to delay traffic on one path or the other. It should also be understood that paths 402 and 404 could be virtual local area networks (VLANS), virtual wide area network (VWAN), or IP tunnels, as well as other types of paths. A protocol such as the real-time transport protocol (RTP) or RTP control protocol (RTCP) could be utilized for determining the delay metrics. It should also be understood that MSC 410 controls delay buffer 412 for traffic sent and received on path 402. Likewise, MSC 420 controls delay buffer 414 for traffic sent and received on path 404.

Figure 6:
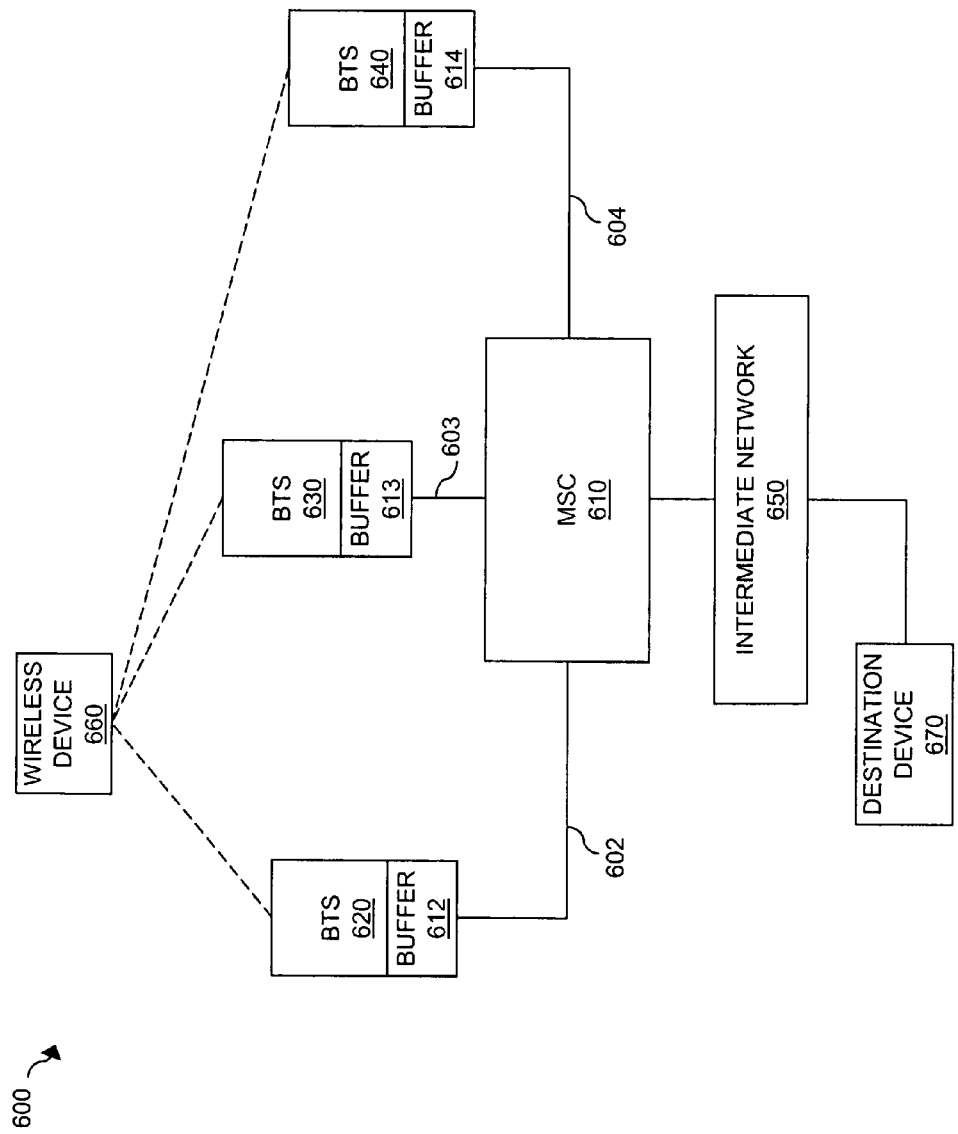
FIG. 6 illustrates a communication system in an embodiment of the invention.

FIG. 6 illustrates communication network 600 in an embodiment of the invention. Communication network 600 includes MSC 610. Communication network 600 further includes BTS 620, BTS 630, and BTS 640, each BTS having delay buffers 612, 613, and 614 respectively. MSC 610 is in communication with BTS 620, BTS 630, and BTS 640 over communication paths 602, 603, and 604 respectively. Wireless device 660 is in communication with BTSs 620, 630, and 640 by a wireless communication protocol well known in the art, such as CDMA, TDMA, or GSM, or well known variations thereof. MSC 610 is also in communication with intermediate network 650. Destination device 670 is coupled to intermediate network 650.

In this embodiment of the invention, communication network 600 operates as described above with respect to communication network 400. However, communication network 600 includes an additional BTS—BTS 630. In such a case, MSC 610 must perform additional operations to balance out the delay associated with all three paths 602, 603, and 604. Consider a case wherein the delay metric for path 604 is greater than the delay metric for path 603, and wherein the delay metric for path 603 is greater than the delay metric for path 602. In this case, MSC 610 will instruct BTS 620 to adjust buffer 612 so that traffic on path 602 is synchronized with the slowest path—path 604. However, path 603 will remain unsynchronized with respect to path 602 and 604. MSC 610 will therefore also instruct BTS 630 to adjust buffer 613 so that traffic on path 603 is synchronized with path 604 and path 602. In another case, path 603 could be initially synchronized with path 602. However, upon BTS 620 adjusting buffer 612, path 603 would then be out of synch with path 602. In response, MSC 610 would instruct BTS 630 to adjust buffer 613.

In this embodiment, MSC 610 could determine several different delay differentials. For instance, a delay deferential could be calculated between path 602 and 603. Similarly, a delay differential could be calculated between path 602 and 604, or between path 603 and 604. Regardless, by adjusting one of buffers 612, 613, or 614, the delay differentials are also affected. It is therefore necessary for MSC 610 to reevaluate the delay differentials to determine if further adjustments are required.

What is claimed is:

1. A method of operating a communication system, the method comprising:

in a mobile switching center, determining a first delay metric for first traffic transmitted on a first path to the mobile switching center from a first base station, wherein the first delay metric is determined from a difference in time between when a first timing message is sent from the first base station and when the first timing message is received at the mobile switching center;

in the mobile switching center, determining a first delay differential based on the first delay metric and a second delay metric for second traffic transmitted on a second path to the mobile switching center from a second base station, wherein the second delay metric is determined from a difference in time between when a second timing message is sent from the second base station and when the second timing message is received at the mobile switching center and wherein the first delay differential is determined from the difference in time between the first delay metric and the second delay metric;

transmitting a control message indicating the first delay differential from the mobile switching center to the second base station;

receiving the control message at the second base station; and in response to receiving the control message, in the second base station, delaying the second traffic based on the first delay differential.

2. The method of claim 1 further comprising, in the mobile switching center, determining a second delay differential based on the first delay metric and a third delay metric for third traffic transmitted on a third path to the mobile switching center from a third base station, transmitting a second control message indicating the second delay differential from the mobile switching center to the third base station, receiving the second control message at the third base station, and, in response to receiving the second control message, in the third base station, delaying the third traffic based on the second delay differential.

3. The method of claim 1 further comprising, in the mobile switching center, transmitting a timing request to the first base station and receiving the first timing message from the first base station in response to the timing request.

4. The method of claim 1 further comprising delaying the second traffic based on the delay differential to synchronize the second traffic with the first traffic to within a synchronization parameter.

5. The method of claim 1 wherein the first path comprises an Ethernet path.

6. The method of claim 5 wherein the second path comprises a T-1 line.

7. The method of claim 1 wherein the first path comprises a WiMAX path.

8. The method of claim 1 wherein the first traffic comprises voice communications.

9. A communication system comprising:

a mobile switching center configured to determine a first delay metric for first traffic transmitted on a first path to the mobile switching center from a first base station, wherein the mobile switching center determines the first delay metric from a difference in time between when a first timing message is sent from the first base station and when the first timing message is received at the mobile switching center, determine a first delay differential based on the first delay metric and a second delay metric for second traffic transmitted on a second path to the mobile switching center from a second base station, and transmit a control message indicating the first delay differential to the second base station, wherein the mobile switching center determines the second delay metric from a difference in time between when a second timing message is sent from the second base station and when the second timing message is received at the mobile switching center and determines the first delay differential from the difference in time between the first delay metric and the second delay metric;

the second base station configured to receive the control message; and the second base station further having a delay buffer configured to delay the second traffic based on the first delay differential.

10. The communication system of claim 9 wherein the mobile switching center is further configured to determine a second delay differential based on the first delay metric and a third delay metric for third traffic transmitted on a third path to the mobile switching center from a third base station having another delay buffer, transmit a second control message indicating the second delay differential to the third base station, and wherein the third base station is configured to receive the control message and the other delay buffer is further configured to delay the third traffic based on the second delay differential.

11. The communication system of claim 9 wherein the mobile switching center is further configured to transmit a timing request to the first base station and receive the first timing message from the first base station in response to the timing request.

12. The communication system of claim 9 wherein the delay buffer is further configured to delay the second traffic based on the delay differential to synchronize the second traffic with the first traffic to within a synchronization parameter.

13. The communication system of claim 9 wherein the first path comprises an Ethernet path.

14. The communication system of claim 13 wherein the second path comprises a T-1 line.

15. The communication system of claim 9 wherein the first path comprises a WiMAX path.

16. The communication system of claim 9 wherein the first traffic comprises voice communications.

* * * * *